US011564093B2

(12) United States Patent
Kim et al.

(10) Patent No.: US 11,564,093 B2
(45) Date of Patent: Jan. 24, 2023

(54) APPARATUS AND METHOD OF PROVIDING SECURITY STRATEGY FOR VEHICLE

(71) Applicants: HYUNDAI MOTOR COMPANY, Seoul (KR); KIA MOTORS CORPORATION, Seoul (KR)

(72) Inventors: Soo Yun Kim, Incheon (KR); Jae Am Seo, Seongnam-si (KR); Dong Youl Lee, Seoul (KR); Won Ho Shin, Seoul (KR); Hee Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 735 days.

(21) Appl. No.: 16/562,800

(22) Filed: Sep. 6, 2019

(65) Prior Publication Data

US 2020/0162918 A1    May 21, 2020

(30) Foreign Application Priority Data

Nov. 16, 2018   (KR) .......................... 10-2018-0142017

(51) Int. Cl.
*H04W 12/08* (2021.01)
*H04W 12/06* (2021.01)
*G06F 1/28* (2006.01)
*B60R 25/40* (2013.01)
*G07C 5/00* (2006.01)
*H04W 12/082* (2021.01)
*G07C 5/08* (2006.01)

(52) U.S. Cl.
CPC ......... *H04W 12/082* (2021.01); *B60R 25/403* (2013.01); *G06F 1/28* (2013.01); *G07C 5/008* (2013.01); *G07C 5/0808* (2013.01); *H04W 12/06* (2013.01)

(58) Field of Classification Search
CPC .. H04W 12/082; H04W 12/06; B60R 25/403; G06F 1/28; G07C 5/008; G07C 5/0808
USPC ............................................................. 726/6
See application file for complete search history.

(56) References Cited

U.S. PATENT DOCUMENTS

| 7,860,486 | B2* | 12/2010 | Frank | H04W 12/37 |
| | | | | 455/410 |
| 9,047,494 | B1* | 6/2015 | Smith | G06F 21/88 |
| 10,748,364 | B1* | 8/2020 | Kulshrestha | H04W 12/082 |
| 2006/0089125 | A1* | 4/2006 | Frank | H04W 12/37 |
| | | | | 455/411 |
| 2006/0089126 | A1* | 4/2006 | Frank | H04L 63/10 |
| | | | | 455/411 |
| 2010/0075604 | A1* | 3/2010 | Lydon | H04W 12/082 |
| | | | | 726/4 |

(Continued)

*Primary Examiner* — Logan M Kraft
*Assistant Examiner* — John D Bailey
(74) *Attorney, Agent, or Firm* — Morgan, Lewis & Bockius LLP

(57) ABSTRACT

A security strategy providing apparatus of a vehicle includes a communication circuit, a power controller, and at least one control circuit electrically connected to the communication circuit and the power controller. The at least one control circuit is configured to detect a connection of an external apparatus or an inflow of external data, and to block at least part of a function provided by the vehicle, at least part of power supplied by the power controller, or the at least part of the function and the at least part of the power, based on a detection result of the connection of the external apparatus or the inflow of the external data.

14 Claims, 10 Drawing Sheets

(56) References Cited

U.S. PATENT DOCUMENTS

| | | | | |
|---|---|---|---|---|
| 2010/0134275 A1* | 6/2010 | Fitzgerald | ........... | H04W 12/082 |
| | | | | 340/5.31 |
| 2010/0191410 A1* | 7/2010 | Torlo | ...................... | H04L 63/12 |
| | | | | 713/168 |
| 2011/0093913 A1* | 4/2011 | Wohlert | .............. | H04L 63/0861 |
| | | | | 726/1 |
| 2013/0091564 A1* | 4/2013 | Fitzgerald | ................ | G06F 21/88 |
| | | | | 726/17 |
| 2015/0121472 A1* | 4/2015 | Sengoku | .............. | H04W 4/029 |
| | | | | 726/4 |
| 2015/0358329 A1* | 12/2015 | Noda | ...................... | G06F 21/57 |
| | | | | 726/4 |
| 2015/0372995 A1* | 12/2015 | Hefter | ................... | H04L 63/083 |
| | | | | 713/171 |
| 2016/0110929 A1* | 4/2016 | Park | ....................... | G07C 5/008 |
| | | | | 709/227 |
| 2016/0330204 A1* | 11/2016 | Baur | ....................... | H04L 63/06 |
| 2017/0103647 A1* | 4/2017 | Davis | ...................... | H04W 4/14 |
| 2018/0040172 A1* | 2/2018 | Funk | .................... | H04W 24/08 |
| 2018/0077062 A1* | 3/2018 | Park | ....................... | G07C 5/0841 |
| 2018/0204015 A1* | 7/2018 | Nakamura | ............ | H04W 12/08 |
| 2019/0281052 A1* | 9/2019 | Lekkas | ..................... | H04L 9/14 |
| 2020/0086827 A1* | 3/2020 | Tanaka | ................... | G05D 1/028 |
| 2021/0092019 A1* | 3/2021 | Fang | ....................... | H04L 41/28 |

\* cited by examiner

| INTRUSION DETECTION STEP | SITUATION | FUNCTION LIMITATION LEVEL |
|---|---|---|
| 0 | GENERAL | ~ |
| 1 | CONNECTION OF EXTERNAL TERMINAL | ~ |
| 2 | CONNECTION OF UNAPPROVED DIAGNOSTIC DEVICE AND UNAUTHORIZED MEMORY | Level 1/2 |
| 3 | DATA MONITORING OF UNREGISTERED TERMINAL | Level 3 |
| 4 | INFLOW OF UNDEFINED /UNREGISTERED DATA | Level 4 |
| 5 | INFLOW OF UNDEFINED /UNREGISTERED DATA (Over BUS load) | Level 5 |

FIG. 3

| BLOCKING LEVEL / FUNCTION | Level 1 | Level 2 | Level 3 | Level 4 | Level 5 | DESCRIPTIONS |
|---|---|---|---|---|---|---|
| VEHICLE WIRELESS COMMUNICATION | ON | ON | ON | ON | OFF | AP POWER (H/W) CONTROL |
| | ON | ON | ON | OFF | — | COMMUNICATION MODULE POWER (H/W) CONTROL |
| eCall | ON | ON | OFF | — | — | CONTROL FOR EACH FUNCTION (S/W) |
| UNLINKING TO PERSONAL INFORMATION | ON | OFF | — | — | — | |
| LINKING TO PERSONAL INFORMATION | OFF | — | — | — | — | |

FIG. 4

APPARATUS AND METHOD OF PROVIDING SECURITY STRATEGY FOR VEHICLE

CROSS-REFERENCE TO RELATED APPLICATION

This application claims the benefit of priority to Korean Patent Application No. 10-2018-0142017, filed on Nov. 16, 2018 in the Korean Intellectual Property Office, the entire contents of which are incorporated herein by reference.

TECHNICAL FIELD

The present disclosure relates to a technology for providing a security strategy in providing a connectivity service in a vehicle.

BACKGROUND

With the development of the automobile industry, a system for providing various services using wireless communication technology is continuously being developed to provide convenience to a driver. For example, a vehicle may provide the connectivity (or connected car) service through wireless communication. When the vehicle provides a connectivity service, various external apparatuses may be connected to the vehicle, various pieces of data may flow in and out, and the data requiring security may be stored. Accordingly, it is necessary to reconsider the security of the vehicle.

SUMMARY

The technology for detecting an external intrusion may be applied to a vehicle. However, when the external intrusion is detected with respect to a vehicle, the technology of applying appropriate restrictions to a system may not be provided to the vehicle. A malfunction of the vehicle or a leakage of personal information may occur, when security is not maintained in the vehicle that provides a connectivity service.

The present disclosure has been made to solve the above-mentioned problems occurring in the prior art while advantages achieved by the prior art are maintained intact.

The present disclosure is to detect an external intrusion in a vehicle and to provide a security strategy suitable for detected intrusions.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a security strategy providing apparatus of a vehicle may include a communication circuit, a power controller, and at least one control circuit electrically connected to the communication circuit and the power controller. The at least one control circuit may be configured to detect a connection of an external apparatus or an inflow of external data, to block at least part of a function provided by the vehicle, at least part of power supplied by the power controller, or the at least part of the function and the at least part of the power, based on a detection result of the connection of the external apparatus or the inflow of the external data.

According to an exemplary embodiment, the external apparatus may include at least one of an external diagnostic device, an external memory, an external terminal, or an external controller.

According to an exemplary embodiment, the at least one control circuit may detect a connection of an unauthenticated or unregistered external apparatus.

According to an exemplary embodiment, the at least one control circuit may detect an inflow of unauthenticated or unregistered external data.

According to an exemplary embodiment, the at least one control circuit may be further configured to determine a level of blocking of the at least part of the function, the at least part of power, or the at least part of the function and the at least part of the power, based on characteristics of a connected external apparatus or incoming external data.

According to an exemplary embodiment, the at least one control circuit may block the at least part of the function when a connection of an unauthenticated or unregistered external apparatus is detected.

According to an exemplary embodiment, the at least one control circuit may block a function of a connectivity service provided by the vehicle when a connection of an unauthenticated or unregistered external diagnostic device or external memory is detected.

According to an exemplary embodiment, the at least one control circuit may block a function of a connectivity service provided by the vehicle and a function associated with the communication circuit when a connection of an unauthenticated or unregistered external terminal or a connection of an external controller is detected.

According to an exemplary embodiment, the at least one control circuit may control the power controller to shut off power supplied to at least part of the communication circuit or a part of the at least one control circuit when an inflow of unauthenticated or unregistered external data is detected.

According to an exemplary embodiment, the at least one control circuit may control the power controller to shut off power supplied to the communication circuit when an incoming amount of the unauthenticated or unregistered external data is less than a specified value.

According to an exemplary embodiment, the at least one control circuit may control the power controller to shut off power supplied to a part of the at least one control circuit and the communication circuit when an incoming amount of the unauthenticated or unregistered external data is greater than a specified value.

According to another aspect of the present disclosure, a method of providing a security strategy for a vehicle may include steps of detecting a connection of an external apparatus or an inflow of external data and blocking at least part of a function provided by the vehicle, at least part of power supplied by a power controller, or the at least part of the function and the at least part of the power, based on a result of the step of detecting.

According to an exemplary embodiment, the step of detecting may include detecting a connection of an unauthenticated or unregistered external apparatus or an inflow of unauthenticated or unregistered external data.

According to an exemplary embodiment, the step of blocking may include blocking the at least part of the function when a connection of an unauthenticated or unregistered external apparatus is detected.

According to an exemplary embodiment, the step of blocking may include controlling the power controller to shut off power supplied to at least part of a communication circuit or a part of at least one control circuit when an inflow of unauthenticated or unregistered external data is detected.

BRIEF DESCRIPTION OF THE DRAWINGS

The above and other objects, features and advantages of the present disclosure will be more apparent from the following detailed description taken in conjunction with the accompanying drawings:

FIG. 3 is a table illustrating an exemplary criterion for determining a function limiting level in an apparatus for providing a security strategy of a vehicle, according to an exemplary embodiment of the present disclosure;

FIG. 4 is a table illustrating an exemplary blocking function according to a function limitation level in a security strategy providing apparatus of a vehicle, according to an exemplary embodiment of the present disclosure;

DETAILED DESCRIPTION

Figure 1:
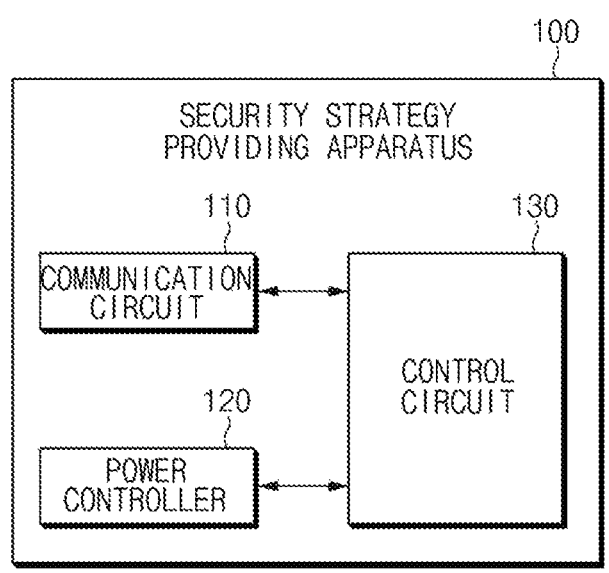
FIG. 1 is a block diagram illustrating a configuration of a security strategy providing apparatus of a vehicle, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a configuration of a security strategy providing apparatus of a vehicle, according to an exemplary embodiment of the present disclosure.

Referring to FIG. 1, a security strategy providing apparatus 100 of a vehicle according to an exemplary embodiment may include a communication circuit 110, a power controller 120, and a control circuit 130. The security strategy providing apparatus 100 of FIG. 1 may be mounted in the vehicle.

The communication circuit 110 may be configured to communicate with the outside. The communication circuit 110 may support wireless communication of various schemes and may receive data from a server. A connectivity service may be provided to the vehicle by the communication circuit 110. The communication circuit 110 according to an exemplary embodiment of the present disclosure may be a hardware device implemented with various electronic circuits to transmit and receive signals via wireless or landline connections.

The power controller 120 may control the power supplied to each of the components included in the vehicle. For example, the power controller 120 may control the power supplied to the communication circuit 110 and the power supplied to the control circuit 130.

The control circuit 130 may be electrically connected to the communication circuit 110 and the power controller 120. The control circuit 130 may control the communication circuit 110 and the power controller 120 and may perform various data processing and calculation. The control circuit 130 may be, for example, a communication control unit (CCU), an electronic control unit (ECU) or another sub-controller, which is mounted in the vehicle. An embodiment is exemplified in FIG. 1 as the control circuit 130 is a single configuration, but is not limited thereto. For example, the control circuit 130 may be implemented to be divided into two or more portions.

The power controller 120 and the control circuit 130 according to an exemplary embodiment of the present disclosure each may be a processor (e.g., computer, microprocessor, CPU, ASIC, circuitry, etc.). The power controller 120 and the control circuit 130 each may be implemented through a non-transitory memory configured to store data with respect to algorithms configured to control operations of various components in the vehicle or software instructions reproducing the algorithms, and a processor configured to perform the operations described hereinafter by using the data stored in the memory. Herein, the memory and the processor may be implemented as separate semiconductor circuits. Alternatively, the memory and the processor may be implemented as a single integrated semiconductor circuit. The processor may embody one or more processor(s).

According to an exemplary embodiment, the control circuit 130 may detect a connection of an external apparatus or an inflow of external data. The control circuit 130 may detect the connection of the external apparatus and/or the inflow of the external data, as a means of preventing external intrusion. For example, the external apparatus may include at least part of an external diagnostic device, an external memory, an external terminal, or an external controller. The control circuit 130 may detect the connection of an external apparatus that is not authenticated or registered. The control circuit 130 may detect the inflow of external data that is not authenticated or registered.

According to an exemplary embodiment, the control circuit 130 may block the at least part of the functions provided by the vehicle and/or at least part of the power supplied by the power controller 120, based on the detected result. The control circuit 130 may improve the security by appropriately blocking the function of the connectivity service or power, when the security cannot be guaranteed by an external apparatus or external data.

According to an exemplary embodiment, the control circuit 130 may determine the level of blocking based on the characteristics of the connected external apparatus or incoming external data. The control circuit 130 may determine the function to be blocked or the configuration to block the power, depending on the blocking level.

According to an exemplary embodiment, the control circuit 130 may block at least part of the function of the connectivity service provided by the vehicle, when the connection of the unauthenticated or unregistered external apparatus is detected. For example, the control circuit 130 may block the function of the connectivity service provided by the vehicle, when the connection of the external diagnostic device or external memory that is not authenticated or registered is detected. For another example, the control circuit 130 may block the function of the connectivity service provided by the vehicle and the function associated with the communication circuit 110, when the connection of the external terminal or external memory that is not authenticated or registered is detected. The control circuit 130 may block the function of the connectivity service and/or the function of the communication circuit 110, using software, when the security is degraded by the connection of the external apparatus. As such, the intrusion by an external apparatus or the leakage of security data may be prevented.

According to an exemplary embodiment, the control circuit 130 may control the power controller 120 to shut off power supplied to the part of the communication circuit 110 and/or the control circuit 130, when the inflow of the unauthenticated or unregistered external data is detected. For example, the control circuit 130 may control the power controller 120 to shut off power supplied to the communication circuit 110, when the inflow amount of unauthenticated or unregistered external data is less than a specified value. For another example, the control circuit 130 may control the power controller 120 to shut off power supplied to a part of the control circuit 130 (e.g., a portion associated with the connectivity service) and the communication circuit 110, when the inflow amount of unauthenticated or unregistered external data is greater than the specified value. The control circuit 130 may shut off the power supplied to the associated hardware to block the hardware itself from the outside, when the security is degraded due to the inflow of external data. As such, the intrusion of external data or the leakage of security data may be prevented more reliably.

Figure 2:
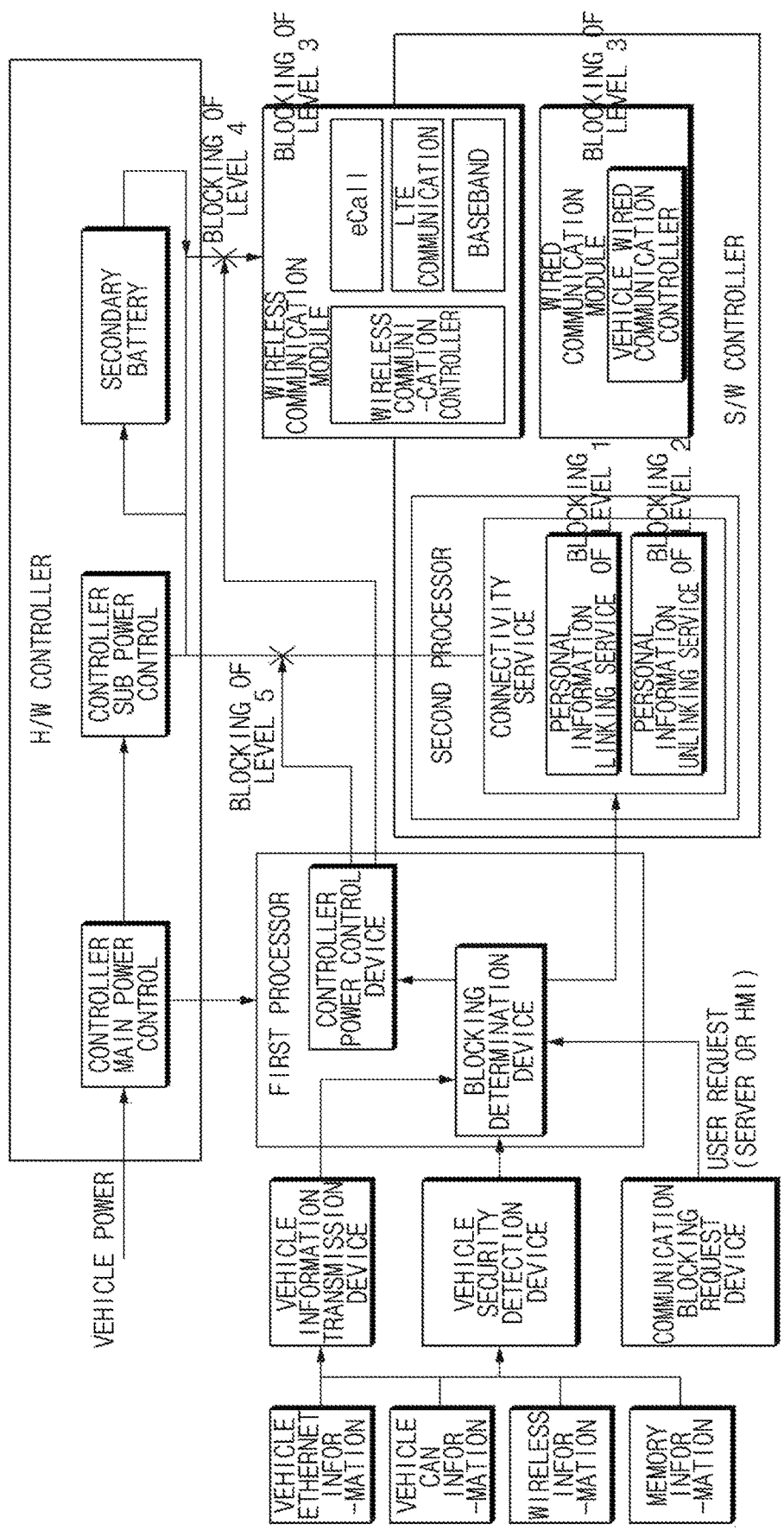
FIG. 2 is a view for describing an exemplary operation of security strategy providing apparatus of a vehicle, according to an exemplary embodiment of the present disclosure.

FIG. 2 is a view for describing an exemplary operation of security strategy providing apparatus of a vehicle, according to an exemplary embodiment of the present disclosure.

Referring to FIG. 2, a vehicle information transmission device may transmit the information of the vehicle wired communication to a blocking determination device. The vehicle security detection device may detect the intrusion to the vehicle wired communication (e.g., CAN, Ethernet, LIN, Flexray, and the like) and vehicle wireless communication. The vehicle security detection device may define the level for the intrusion and may transmit the defined level to the blocking determination device. A communication blocking request device may transmit the communication blocking level by a user's request, to the blocking determination device.

A first processor may include a blocking determination device and a controller power control device. The blocking determination device may determine the function to be restricted. The blocking determination device may determine the blocking level and the function to be restricted, by combining the input information (e.g., vehicle information, security detection, communication blocking request, and the like). The controller power control device may control the power transmitted to a second processor and a communication module.

The second processor may provide the connectivity service. The first processor and the second processor may be referred to as the "control circuit" 130 of FIG. 1. The connectivity service may include a personal information linking service and a personal information unlinking service.

The wireless communication module may include a wireless communication controller, and may provide a wireless communication function such as eCall, LTE communication, baseband transmission, and the like. The wired communication module may include a vehicle wired communication controller and may provide the wired communication function in a vehicle.

The software controller may control the software based on the result determined by the blocking determination device. The software controller may limit the function of the connectivity service or the function of the communication module, as software. For example, the software controller may deactivate the personal information linking service of the connectivity service, when the blocking level is '1'; the software controller may deactivate the personal information unlinking service of the connectivity service, when the blocking level is '2'; the software controller may deactivate the function of the communication module, when the blocking level is '3'.

The hardware controller may forcibly control the power supplied to the hardware, based on the result determined by the blocking determination device. For example, the hardware controller may control the power supplied to the first processor, the second processor, and the communication module. The hardware controller may limit the function of the second processor or the function of the wireless communication module by shutting off the supplied power. For example, the hardware controller may shut off the power supplied to the communication module, when the blocking level is '4'; the hardware controller may shut off the power supplied to the second processor, when the blocking level is '5'.

FIG. 3 is a table illustrating an exemplary criterion for determining a function limiting level in an apparatus for providing a security strategy of a vehicle, according to an exemplary embodiment of the present disclosure.

Referring to FIG. 3, the vehicle may detect the connection of an external terminal. Because the risk of security is low when the external terminal is an authenticated terminal, a separate action may not be performed. The vehicle may determine that the function limit level is 1 or 2, when an unapproved diagnostic device or an unauthorized memory is connected. The vehicle may determine that the function limit level is 3, when the data monitoring of the unregistered terminal is detected. The vehicle may determine the function limit level to be 4, when the undefined data or unregistered data is input. The vehicle may determine the function limit level to be 5, when the amount of undefined data or unregistered data is greater than a specified value. As the function limitation level is high, the vehicle may perform a stronger blocking strategy.

FIG. 4 is a table illustrating an exemplary blocking function according to a function limitation level in a security strategy providing apparatus of a vehicle, according to an exemplary embodiment of the present disclosure.

Referring to FIG. 4, the vehicle may block the personal information linking service among the connectivity services, in compliance with level 1. The vehicle may block the personal information unlinking service, that is, all of the connectivity services, in compliance with level 2. The vehicle may block an eCall function using a communication circuit, in compliance with level 3. In level 1 to level 3, the vehicle may block each function using software.

The vehicle may shut off the power of the communication module, in compliance with level 4. The vehicle may shut off the power of an application processor (AP), in compliance with level 5. In level 4 and level 5, the vehicle may block the hardware configuration from the outside, by controlling the power.

Figure 5:
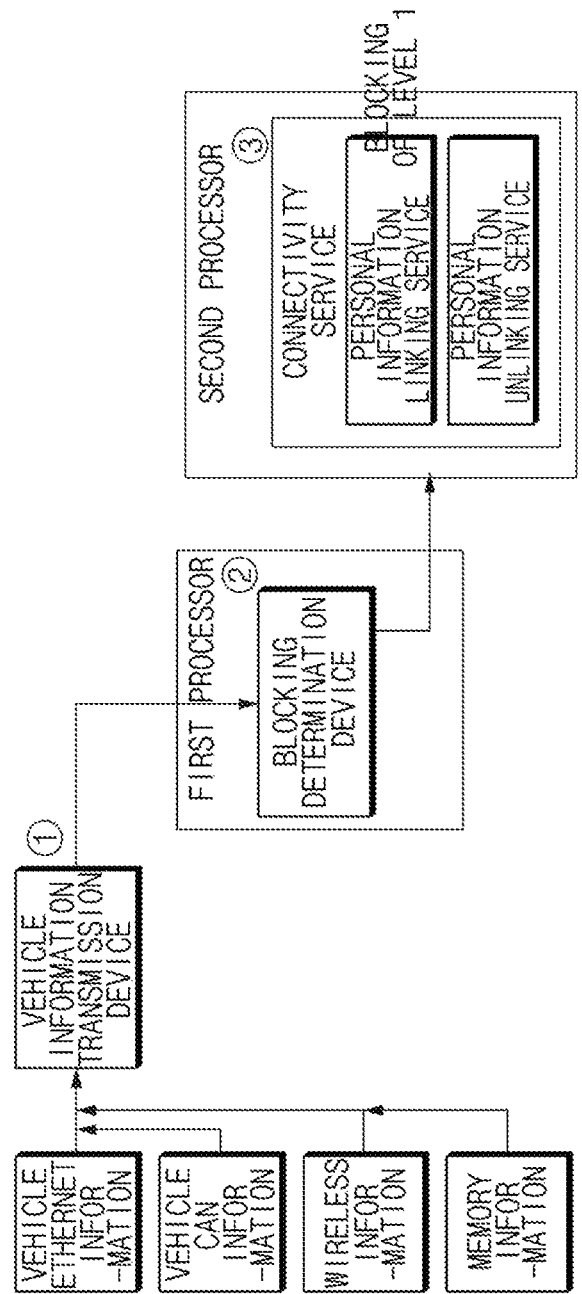
FIG. 5 is a view for describing an exemplary operation of security strategy providing apparatus of a vehicle, according to an exemplary embodiment of the present disclosure.

FIG. 5 is a view for describing an exemplary operation of security strategy providing apparatus of a vehicle, according to an exemplary embodiment of the present disclosure.

Referring to FIG. 5, a vehicle information transmission device may collect various pieces of information (e.g., vehicle Ethernet information, vehicle CAN information, wireless information, and memory information) associated with a vehicle. The vehicle information transmission device may transmit the collected information to a blocking determination device. For example, the blocking determination device may block the personal information linking service among the connectivity services executed by the second processor, to support the functions according to the act on the protection of personal information for each country, when the violation of privacy laws occurs. Information about personal information laws may be stored in advance.

Figure 6:
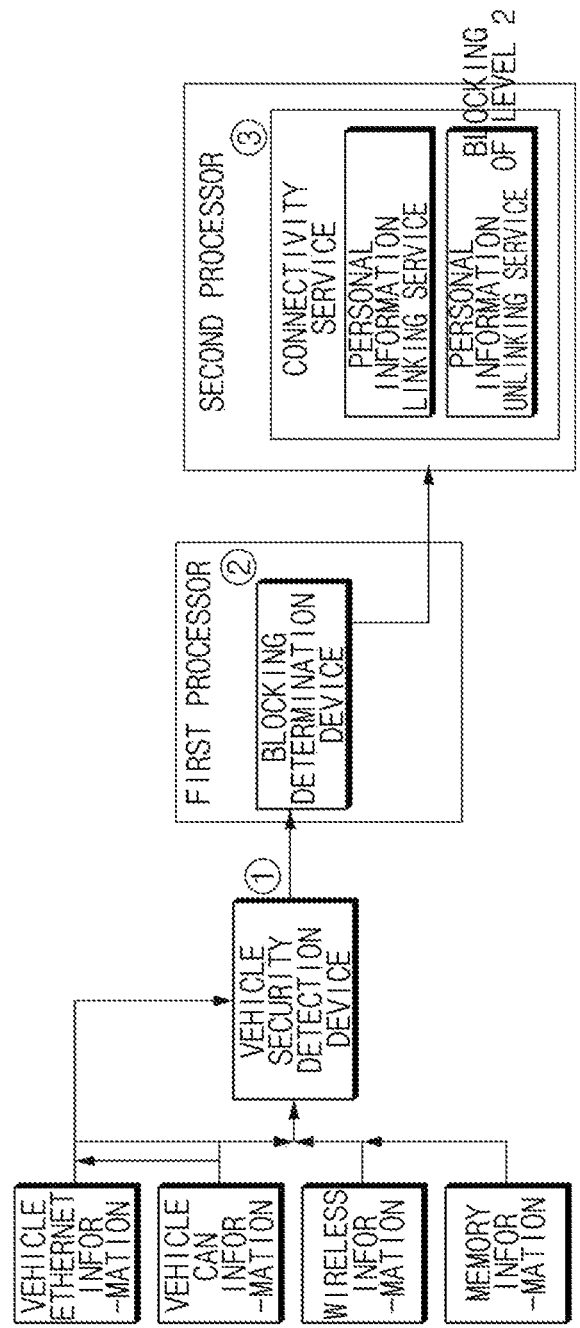
FIG. 6 is a view for describing an exemplary operation of security strategy providing apparatus of a vehicle, according to an exemplary embodiment of the present disclosure.

FIG. 6 is a view for describing an exemplary operation of security strategy providing apparatus of a vehicle, according to an exemplary embodiment of the present disclosure.

Referring to FIG. 6, a vehicle security detection device may collect various pieces of information associated with a vehicle. The vehicle security detection device may transmit the collected information to a blocking determination device. For example, the blocking determination device may determine the connection of an unapproved diagnostic device or the recognition of an unauthenticated memory. The connection of an unapproved diagnostic device or the recognition of an unauthenticated memory may be performed based on information stored in the memory of the vehicle in advance. It may be determined that the diagnostic device or memory other than a diagnostic device or memory that is authenticated in advance is an unapproved diagnostic device or unauthenticated memory. Information about the authenticated diagnostic device or memory may be stored in advance. For example, the blocking determination device may block the connectivity service including the personal information linking service and the personal information unlinking service, which are executed by a second processor, when the connection of an unapproved diagnostic device or the recognition of an unauthenticated memory is detected.

Figure 7:
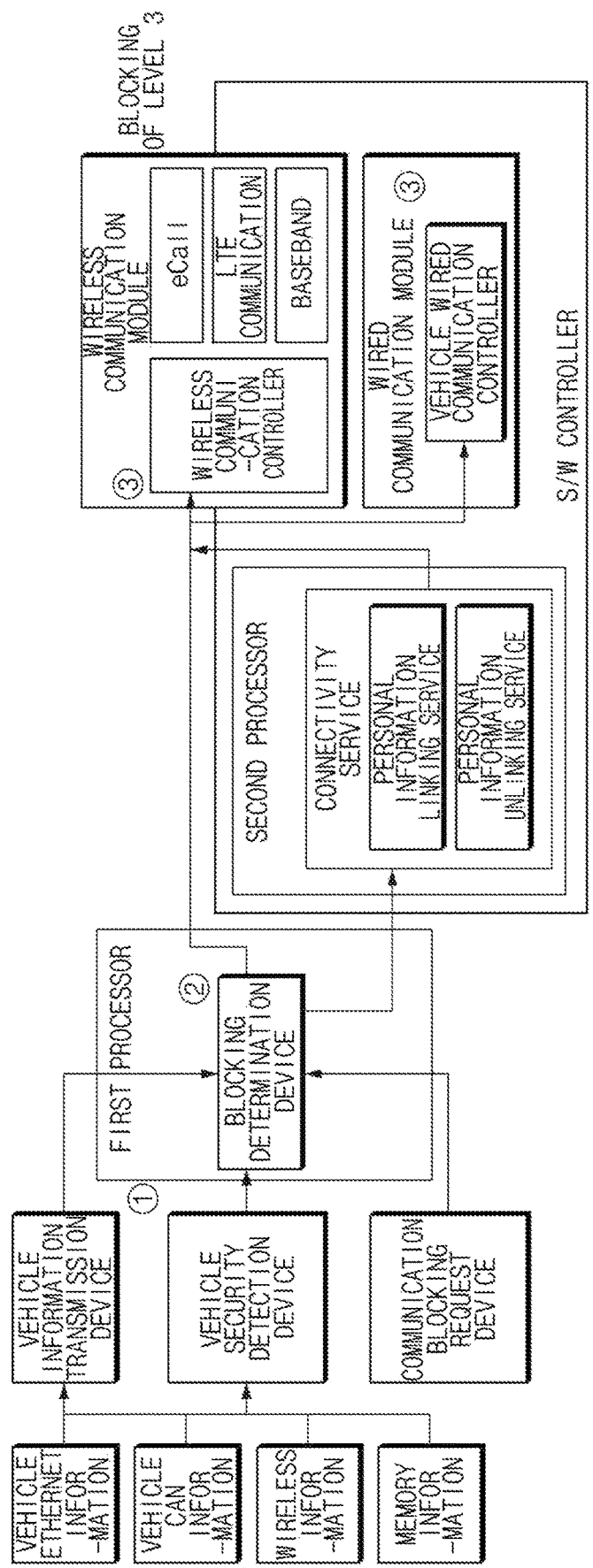
FIG. 7 is a view for describing an exemplary operation of security strategy providing apparatus of a vehicle, according to an exemplary embodiment of the present disclosure.

FIG. 7 is a view for describing an exemplary operation of security strategy providing apparatus of a vehicle, according to an exemplary embodiment of the present disclosure.

Referring to FIG. 7, a vehicle information transmission device, a vehicle security detection device, and a communication blocking request device may transmit the collected information to a blocking determination device. For example, the blocking determination device may determine the connection of the unregistered controller or the unregistered terminal. The connection of the unregistered controller or the unregistered terminal may be performed based on information stored in the memory of the vehicle in advance. It may be determined that the controller or terminal other than the registered controller or terminal is the unregistered controller or the unregistered terminal. Information about the registered controller or terminal may be stored in advance. The blocking determination device may consider that the connection of the unregistered controller or the unregistered terminal is the monitoring by the unregistered controller or the unregistered terminal. For example, the blocking determination device may block the function performed by the wireless communication module and the wired communication module, when the connection of the unregistered controller or the unregistered terminal is detected. Afterward, the wireless communication module and the wired communication module may perform communication through a security message.

Figure 8:
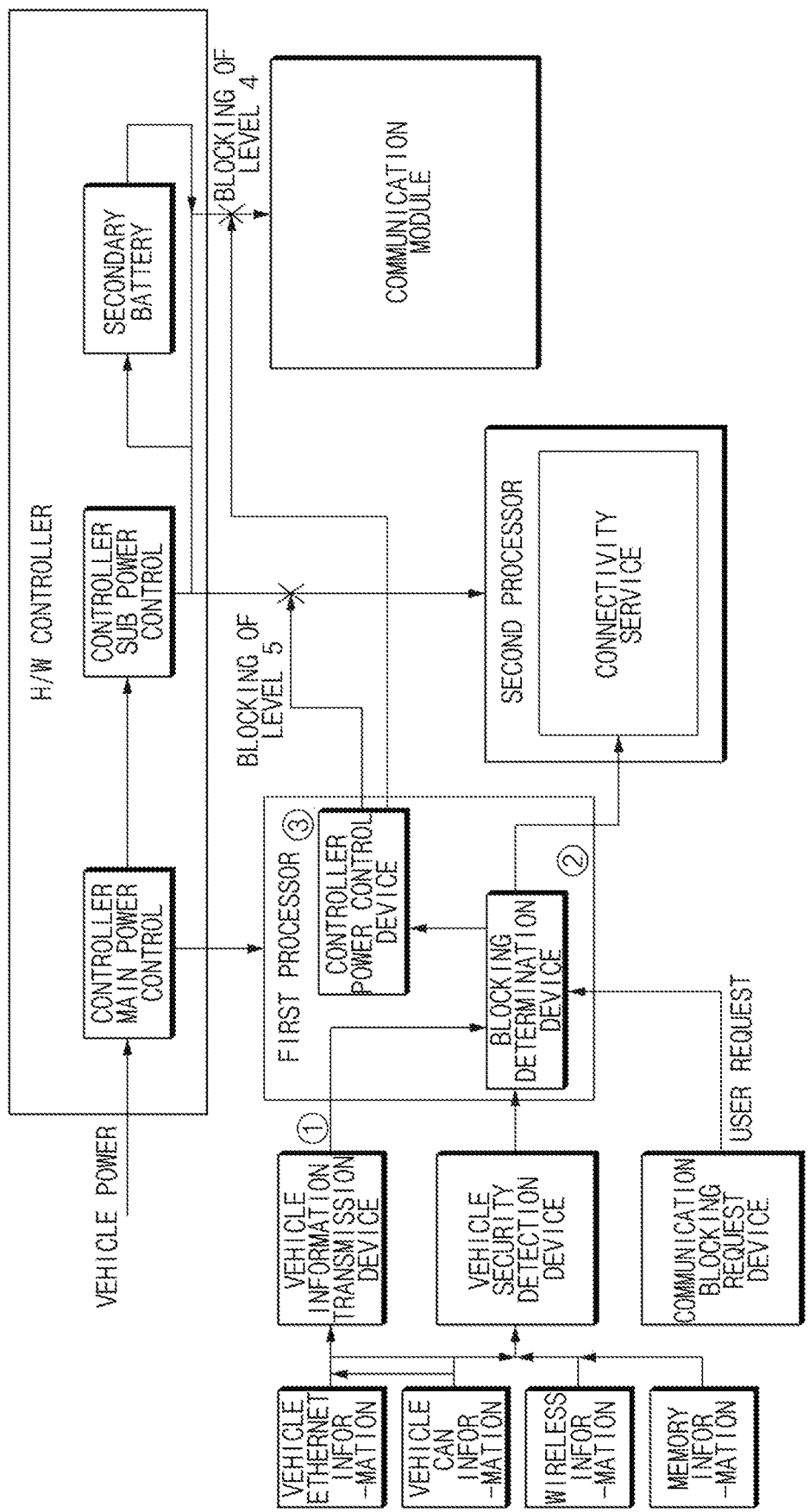
FIG. 8 is a view for describing an exemplary operation of security strategy providing apparatus of a vehicle, according to an exemplary embodiment of the present disclosure.

FIG. 8 is a view for describing an exemplary operation of security strategy providing apparatus of a vehicle, according to an exemplary embodiment of the present disclosure.

Referring to FIG. 8, a vehicle information transmission device, a vehicle security detection device, and a communication blocking request device may transmit the collected information to a blocking determination device. For example, the blocking determination device may determine the inflow of undefined or unregistered data. The blocking determination device may control the power supplied to the communication module and/or the second processor, depending on the amount of incoming data, when the undefined or unregistered data is input on a network. For example, the blocking determination device may control the hardware controller through the controller power control device to shut off the power supplied to the communication module, when the amount of incoming data is less than the specified value. For another example, the blocking determination device may control the hardware controller through the controller power control device to shut off the power supplied to the second processor, when the amount of incoming data is greater than the specified value.

Figure 9:
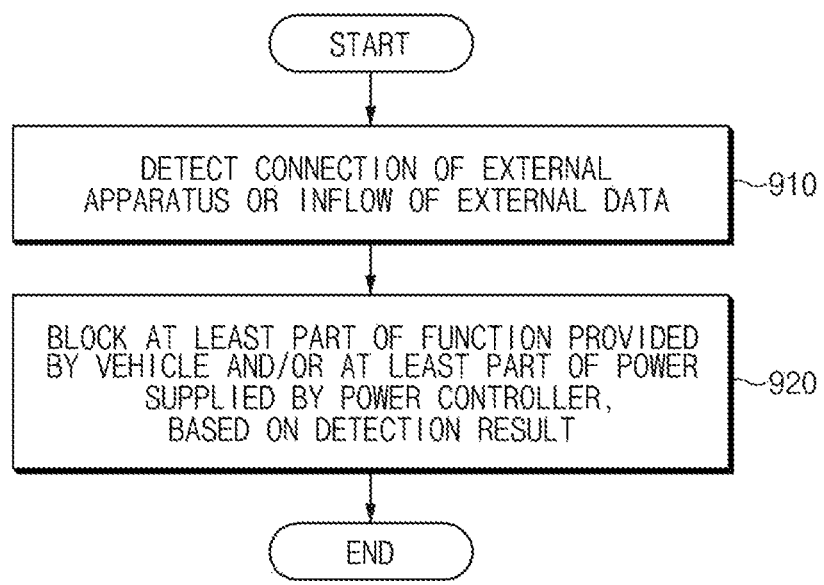
FIG. 9 is a flowchart for describing a security strategy providing method of a vehicle, according to an exemplary embodiment of the present disclosure.

FIG. 9 is a flowchart for describing a security strategy providing method of a vehicle, according to an exemplary embodiment of the present disclosure.

Hereinafter, it is assumed that the security strategy providing apparatus 100 of FIG. 1 performs the process of FIG. 9. In addition, in a description of FIG. 9, it may be understood that an operation described as being performed by an apparatus is controlled by the control circuit 130 or a sub-controller of the security strategy providing apparatus 100.

Referring to FIG. 9, in operation 910, the vehicle may detect a connection of an external apparatus or an inflow of external data. For example, the vehicle may detect the connection of the unregistered external apparatus or the inflow of the unregistered external data.

In operation 920, the vehicle may block at least part of the function provided by the vehicle and/or at least part of the power supplied by a power controller, based on the detection result. For example, the vehicle may determine the level of the security strategy, based on the detection result. The vehicle may block the function of the connectivity service, the function of a communication circuit and/or the power supplied to each component of vehicle, depending on the level of a security strategy. The vehicle may block the function of the connectivity service by restricting software, when the connection of the unregistered diagnostic device or memory is detected. The vehicle may block the functions of the connectivity service and communication circuit, by restricting the software, when the connection of the unregistered controller or terminal is detected. The vehicle may shut off the power supplied to the communication circuit and/or the control circuit depending on the amount of incoming data by restricting hardware, when the inflow of unregistered data is detected.

Figure 10:
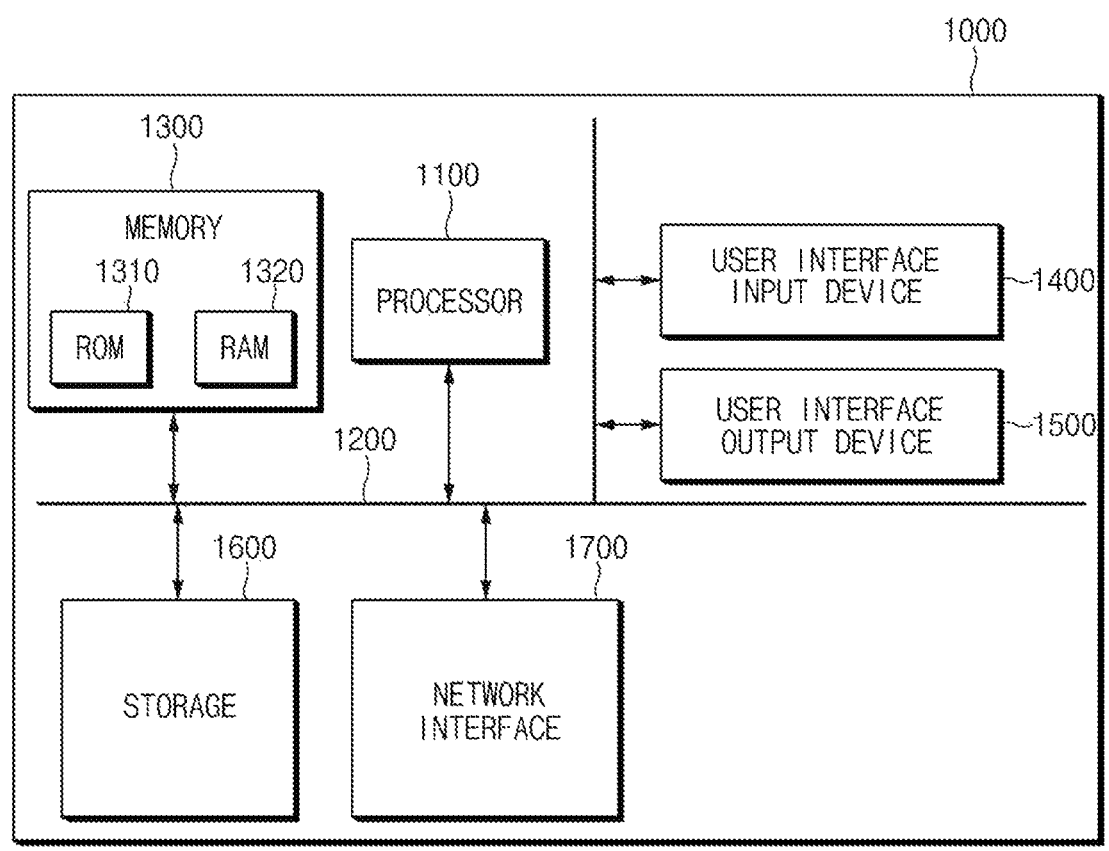
FIG. 10 illustrates a computing system, according to an exemplary embodiment of the present disclosure.

FIG. 10 illustrates a computing system, according to an exemplary embodiment of the present disclosure.

Referring to FIG. 10, an apparatus according to an exemplary embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the exemplary embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an exemplary embodiment of the present disclosure, an apparatus and method of providing a security strategy of a vehicle may block at least part of a function or power depending on the connection of an external apparatus or the inflow of external data, thereby improving the security of the vehicle providing a connectivity service.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A security strategy providing apparatus of a vehicle, the apparatus comprising:
   a communication circuit;
   a power controller; and
   at least one control circuit electrically connected to the communication circuit and the power controller,
   wherein the at least one control circuit is configured to:
   detect a connection of an external apparatus or an inflow of external data,
   block at least part of a function provided by the vehicle, at least part of power supplied by the power controller, or the at least part of the function and the at least part of the power, based on a detection result of the connection of the external apparatus or the inflow of the external data, and
   determine a level of blocking of the at least part of the function, the at least part of the power, or the at least part of the function and the at least part of the power, based on characteristics of a connected external apparatus or incoming external data.

2. The apparatus of claim 1, wherein the external apparatus includes at least one of an external diagnostic device, an external memory, an external terminal, or an external controller.

3. The apparatus of claim 1, wherein the at least one control circuit detects a connection of an unauthenticated or unregistered external apparatus.

4. The apparatus of claim 1, wherein the at least one control circuit detects an inflow of unauthenticated or unregistered external data.

5. The apparatus of claim 1, wherein the at least one control circuit controls the power controller to shut off power supplied to at least part of the communication circuit or a part of the at least one control circuit when an inflow of unauthenticated or unregistered external data is detected.

6. The apparatus of claim 5, wherein the at least one control circuit controls the power controller to shut off power supplied to the communication circuit when an incoming amount of the unauthenticated or unregistered external data is less than a specified value.

7. The apparatus of claim 5, wherein the at least one control circuit controls the power controller to shut off power supplied to a part of the at least one control circuit and the communication circuit
   when an incoming amount of the unauthenticated or unregistered external data is greater than a specified value.

8. The apparatus of claim 1, wherein the at least one control circuit blocks the at least part of the function when a connection of an unauthenticated or unregistered external apparatus is detected.

9. The apparatus of claim 8, wherein the at least one control circuit blocks a function of a connectivity service provided by the vehicle when a connection of an unauthenticated or unregistered external diagnostic device or a connection of an external memory is detected.

10. The apparatus of claim 8, wherein the at least one control circuit blocks a function of a connectivity service provided by the vehicle and a function associated with the communication circuit when a connection of an unauthenticated or unregistered external terminal or a connection of an external controller is detected.

11. A method of providing a security strategy for a vehicle, the method comprising steps of:
    detecting a connection of an external apparatus or an inflow of external data; and blocking at least part of a function provided by the vehicle, at least part of power supplied by a power controller, or the at least part of the function and the at least part of the power, based on a result from the step of detecting, wherein the step of blocking includes:

determining a level of blocking of the at least part of the function, the at least part of the power, or the at least part of the function and the at least part of the power, based on characteristics of a connected external apparatus or incoming external data.

12. The method of claim 11, wherein the step of detecting includes:

detecting a connection of an unauthenticated or unregistered external apparatus or an inflow of unauthenticated or unregistered external data.

13. The method of claim 11, wherein the step of blocking includes:

blocking the at least part of the function when a connection of an unauthenticated or unregistered external apparatus is detected.

14. The method of claim 11, wherein the step of blocking includes:

controlling the power controller to shut off power supplied to at least part of a communication circuit or a part of at least one control circuit when an inflow of unauthenticated or unregistered external data is detected.

\* \* \* \* \*